US008407713B2

(12) United States Patent
Vermette et al.

(10) Patent No.: US 8,407,713 B2
(45) Date of Patent: Mar. 26, 2013

(54) INFRASTRUCTURE OF DATA SUMMARIZATION INCLUDING LIGHT PROGRAMS AND HELPER STEPS

(75) Inventors: Shane Robert Vermette, San Carlos, CA (US); Vijay Manguluru, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1307 days.

(21) Appl. No.: 12/147,726

(22) Filed: Jun. 27, 2008

(65) Prior Publication Data

US 2009/0328043 A1    Dec. 31, 2009

(51) Int. Cl.
G06F 9/46 (2006.01)
G06F 7/00 (2006.01)
(52) U.S. Cl. ........................................ 718/107; 707/737
(58) Field of Classification Search .................. None
See application file for complete search history.

(56) References Cited

U.S. PATENT DOCUMENTS

| | | | |
|---|---|---|---|
| 6,119,222 A | 9/2000 | Shiell et al. | |
| 6,161,105 A | 12/2000 | Keighan et al. | |
| 6,513,065 B1 | 1/2003 | Hafez et al. | |
| 6,560,647 B1 | 5/2003 | Hafez et al. | |
| 6,748,384 B1 | 6/2004 | Rylander et al. | |
| 6,856,970 B1 | 2/2005 | Campbell et al. | |
| 6,978,265 B2 | 12/2005 | Schumacher | |
| 6,988,271 B2 * | 1/2006 | Hunt | 719/315 |
| 7,281,013 B2 | 10/2007 | Chaudhuri et al. | |
| 7,454,698 B2 | 11/2008 | Kohda et al. | |
| 7,509,684 B2 | 3/2009 | McDonald et al. | |
| 7,958,083 B2 | 6/2011 | Vermette et al. | |
| 7,979,385 B2 | 7/2011 | Vermette et al. | |
| 8,046,779 B2 * | 10/2011 | Wusthoff et al. | 719/328 |
| 2005/0066095 A1 | 3/2005 | Mullick et al. | |
| 2005/0262057 A1 * | 11/2005 | Lesh et al. | 707/3 |
| 2009/0248620 A1 | 10/2009 | Vermette | |
| 2009/0248691 A1 | 10/2009 | Vermette | |
| 2009/0276527 A1 * | 11/2009 | McClain et al. | 709/226 |
| 2009/0327290 A1 | 12/2009 | Vermette | |

OTHER PUBLICATIONS

U.S. Appl. No. 12/059,811, filed Mar. 31, 2008, Office Action mailed Aug. 10, 2010, 14 pages.
U.S. Appl. No. 12/059,830, filed Mar. 31, 2008, Office Action mailed Aug. 24, 2010, 20 pages.
U.S. Appl. No. 12/059,830, filed Mar. 31, 2008, Final Office Action mailed Nov. 24, 2010, 12 pages.
U.S. Appl. No. 12/147,709, filed Jun. 27, 2008, Office Action mailed Dec. 16, 2010, 9 pages.

(Continued)

*Primary Examiner* — Gregory Kessler
(74) *Attorney, Agent, or Firm* — Kilpatrick Townsend & Stockton LLP

(57) ABSTRACT

A method of summarizing data includes providing a multi-method summarization program including instructions for summarizing data for a transaction processing system. At least one functional aspect of the transaction processing system for which a summarization of a subset of the data is desired is determined. The functional subset to a user as a light summarization program is exposed. The dependencies of the functional subset can be enforced at runtime allowing packaging flexibility. A method for efficient parallel processing involving not necessarily filled requests for help.

16 Claims, 12 Drawing Sheets

OTHER PUBLICATIONS

U.S. Appl. No. 12/059,811, filed Mar. 31, 2008, Advisory Action mailed Apr. 22, 2011, 3 pages.
U.S. Appl. No. 12/059,830, filed Mar. 31, 2008, Notice of Allowance mailed Mar. 17, 2011, 10 pages.
U.S. Appl. No. 12/147,709, filed Jun. 27, 2008, Notice of Allowance mailed Mar. 22, 2011, 14 pages.
U.S. Appl. No. 12/059,811, filed Mar. 31, 2008, Final Office Action mailed Feb. 9, 2011, 14 pages.
U.S. Appl. No. 12/059,830, filed Mar. 31, 2008, Advisory Action mailed Jan. 31, 2011, 2 pages.
U.S. Appl. No. 12/059,811, filed Mar. 31, 2008, Office Action mailed Aug. 16, 2012, 18 pages.

* cited by examiner

Summarization Runtime Table
202

| Flow ID 204 | Worker ID 206 | Helper ID 208 | Step 210 | Status 212 |
|---|---|---|---|---|
| Flow 1 | 1 | | Initialize | Completed |
| Flow 1 | 1 | | Run | *null* |
| Flow 1 | 1 | | Step 2 | Completed |
| Flow 1 | 1 | | Step 3 | *null* |
| Flow 1 | 1 | | ... | ... |
| Flow 1 | 1 | 1 .. *j* | Step *i* | *null* |
| Flow 1 | 1 | | Wrapup | *null* |
| Flow 1 | 2 | | Initialize | Completed |
| Flow 1 | 2 | | Run | Completed |
| Flow 1 | 2 | | Step 2 | Completed |
| Flow 1 | 2 | | Step 3 | Completed |
| Flow 1 | 2 | | ... | ... |
| Flow 1 | 2 | 1 .. *j* | Step *i* | Completed |
| Flow 1 | 2 | | Wrapup | *null* |
| Flow *m* | 3 | | Initialize | Completed |
| Flow *m* | 3 | | Run | *null* |
| Flow *m* | 3 | | Step 1 | Completed |
| Flow *m* | 3 | | Step 2 | Completed |
| Flow *m* | 3 | | ... | ... |
| Flow *m* | 3 | | Step *n* | *null* |
| Flow *m* | 3 | | Wrapup | *null* |

FIG. 2

```
procedure SUMMARIZE (summarization parameters)
{

// The three main APIs of the summarization program

INIT_PROCESS(summarization parameters as necessary);

RUN_PROCESS(summarization parameters as necessary);

WRAPUP_PROCESS(summarization parameters as necessary);

// The general principle of recovery is to rollback
  // the last transaction.  The program need only then
  // be resubmitted, and by design it will pick up where
  // it left off, as described herein.

exception when others then rollback;
    raise;

};

procedure INIT_PROCESS (summarization parameters as necessary)
{

// Check if the summarization program submission is
  // valid and if so acquire WORKER_ID and setup the
  // summarization instance.  If it is not, raise.

...

// Populate the summarization runtime table with those
  // steps relevant to packaging and relevant to the
  // summarization parameters, i.e. dynamically enable
  // the functional area.

...

// If helpers will be required by the current instance
  // of the summarization program, then set a runtime
  // parameter to indicate this requirement.

commit;

```
procedure RUN_PROCESS (summarization parameters as necessary)
{

// use, for example, dynamic SQL for packaging light programs if (NEED_TO_RUN_STEP(WORKER_ID, "STEP1")) then
  {
    execute immediate "STEP1(WORKER_ID)"; //no compile dependency
  }

...

if (NEED_TO_RUN_STEP(WORKER_ID, "STEPn")) then
  {
    execute immediate "STEPn(WORKER_ID)"; //no compile dependency
  }

} procedure WRAPUP_PROCESS (summarization parameters as necessary)
{

// Cleanup the summarization run, including deletion of the
  // summarization data for WORKER_ID from the summarization
  // runtime table, and including deletion of runtime parameters.

...

commit;

} function NEED_TO_RUN_STEP (WORKER_ID, STEP_NAME)
{

// Check if any database processes relevant to the
  // instance of the summarization program have failed.
  // If so, raise.

...

// Check the summarization runtime table if (STEP_NAME for WORKER_ID has already been completed) then
  {
    return false;
  }
  else
  {
    return true;
  }

```
procedure STEPi (WORKER_ID)
{
   // Perform data transformation according to business needs

...

REGISTER_STEP_COMPLETION(WORKER_ID, "STEPi");

commit;

} procedure REGISTER_STEP_COMPLETION (WORKER_ID, STEP_NAME)
{
   // Mark step as complete in the summarization runtime table.

INFRASTRUCTURE OF DATA SUMMARIZATION INCLUDING LIGHT PROGRAMS AND HELPER STEPS

CROSS-REFERENCES TO RELATED APPLICATIONS

This application is related to U.S. patent application Ser. No. 12/147,709 filed Jun. 27, 2008 (now issued, U.S. Pat. No. 7,979,385), and entitled "SELECTIVE EXPOSURE TO A DATA CONSUMER,", filed concurrently herewith, which is hereby incorporated herein by reference. This application is also related to U.S. patent application Ser. No. 12/059,811, filed Mar. 31, 2008, entitled "INTERACTING METHODS OF DATA EXTRACTION,", and U.S. patent application Ser. No. 12/059,830, filed Mar. 31, 2008, entitled "INTERACTING METHODS OF DATA SUMMARIZATION,", which are hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data structure infrastructure, and in particular to the use of light programs and helper steps in summarizing data.

A common business need is to summarize data that exists in a system. This can be accomplished using a summarization program. A summarization program can involve any number of functional data transformations that bring data from an existing state in a system to a state that is ready or closer to being ready to be viewed by an end user, (e.g., in a report). A report may be any entity that displays summarized data to an end user. A further business need is to be able to summarize varying volumes of data, the volumes of which can differ to such an extent as to require different infrastructures to achieve a required level of performance for the summarization program. The different infrastructures can include a bulk infrastructure, which is suited to summarizing a sufficiently large volume of the data, and an incremental infrastructure, which is suited to summarizing a sufficiently small volume of the data. Various other infrastructures of summarization exist, but for the purposes of explaining the solution herein, they can be considered to fall into the bulk infrastructure or the incremental infrastructure category described above.

One general purpose of a bulk infrastructure is to allow the summarization of large volumes of data. The bulk infrastructure can have its own code path. For instance, for a given data transformation, there exists a portion of SQL code written exclusively to be run in the bulk mode, and another portion of SQL code written exclusively to be run in the incremental mode, and other portions of SQL code as needed for other modes. All of the portions of SQL code may be accomplishing similar functions (for example, including, but not limited to converting transaction currency into global currency), but the techniques involved in tuning SQL code to perform well for a large volume of data may differ from the techniques involved in tuning SQL code to perform well for a small volume of data. The data may have different code paths to follow depending on the mode of summarization. The bulk infrastructure can allow bulk operations that, among other restrictions, can rule out the use of partitioned tables. One general purpose of an incremental infrastructure is to allow summarization in parallel and on smaller volumes of data. For example, the incremental infrastructure can have its own code path and can allow the use of partitioned tables or session specific tables and incremental tuning techniques. Because summarizing data is a complex operation, the summarization infrastructure must allow for efficient tuning techniques, use of table-space, recovery techniques, and CPU usage. Some previous solutions such as data warehousing can fall into such a category. Such previous solutions do not provide for improved use of parallel processing or the ability to nimbly run different portions of the summarization flow.

In another previous solution, the summarization program spawned database processes to help process work. However, only one instance of a summarization program that required help could run at any one time, severely limiting concurrent capabilities. A second instance of the summarization program cannot receive help and must wait until the original program completely ends. This issue stems from the inability to share the help from the spawned processes.

Also, previously, a rigid summarization program structure may have been defined and custom code was developed for each particular step for performance purposes, rather than designing separate code paths. Accordingly, a nimble and scalable solution with a versatile summarization mechanism is desired. Therefore, an improved summarization approach is needed.

BRIEF SUMMARY OF THE INVENTION

Systems and methods in accordance with various embodiments of the present invention can overcome these and other deficiencies in existing approaches to extracting and/or summarizing data.

In various embodiments, a method of summarizing data includes providing a summarization program including instructions for summarizing data for a transaction processing system. At least one functional aspect of the transaction processing system for which a summarization of a subset of the data is desired is determined. A functional subset of the summarization program able to summarize data corresponding to a functional aspect of the transaction processing system may be run or packaged separately. The functional subset to a user as a light summarization program is exposed. The summarization dependencies of the functional subset may be enforced at runtime and therefore may be packaged separately.

In some embodiments, the summarization program may include an incremental infrastructure on which an incremental method of summarization can be provided that is tuned for sufficiently smaller volumes than is the summarization method on a bulk infrastructure; as well, other methods and infrastructures that are tuned to suit their own performance needs may be provided. The summarization program may include a summarization infrastructure upon which a summarization method can be generated to provide flexibility of summarization. A time of processing for the light summarization program may be significantly less than a time of processing for the complete summarization program. The method may include multiple potentially overlapping functional subsets of the summarization program able to summarize data corresponding to functional aspects of the transaction processing system, where summarization dependencies of the multiple functional subsets can be enforced at runtime, and can therefore be packaged separately. An instance of the summarization program may be able to process any or all of the functional subsets depending on parameters passed to the summarization program. The functional subsets may be able to interact according to requirements of the functional subsets. The method may further include designating portions of the summarization program as able to request assistance from helper processes able to be shared among instances of the summarization programs and able to execute in parallel. The method may further include enabling instances of the summarization programs to proceed with processing while waiting for assistance from the helper processes. The method may further include defining rules for the helper processes behavior in responding to requests for assistance. The method may further include setting a parameter for an instance of one of the summarization processes to request assistance from the helper processes.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which:

FIG. 2 illustrates an exemplary table that can be used in accordance with one embodiment;

FIGS. 3-5 illustrate examples of pseudo-code for summarizing data that can be used in accordance with one embodiment;

DETAILED DESCRIPTION OF THE INVENTION

Systems and methods in accordance with various embodiments overcome the aforementioned and other deficiencies in existing approaches to data management and/or consumption. Embodiments provide for a framework for building a summarization program with dynamic customizable runtime paths and a framework for disconnecting helper processes from summarization instances so that they can more efficiently handle requests for help. Embodiments also allow for use of various summarization infrastructures, for light versions of a summarization program, and for different areas of the summarization program to be packaged separately. Further, embodiments allow for reduced runtime for specialized online transaction processing system requirements, for a reduction in dependencies, and for efficient use of external and internal database parallelism. Embodiments further allow for sharing of helper step resources among parallel instances of the summarization program.

A recent business need is to be able to run a subset of the operations performed by a summarization program. This can be achieved by dynamically enabling only a portion of the summarization program as determined by setup or by parameters to the summarization program. The subset of the summarization program can be called a "light" version of the summarization program. Furthermore, because of a light program's infrastructure, just the light version of a summarization program can be packaged, which allows various advantages from flexible licensing to ease of implementation and reduced dependencies.

Figure 1:
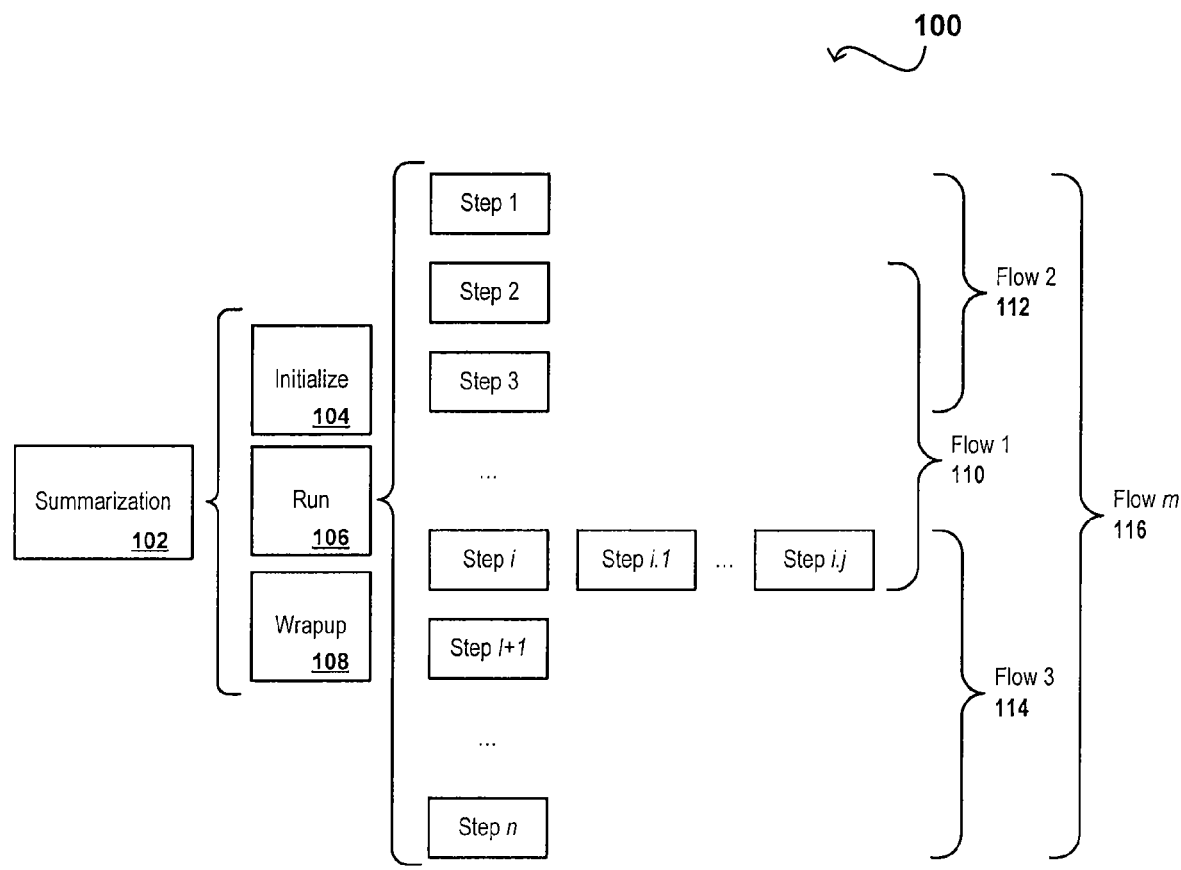
FIG. 1 illustrates an exemplary method for summarizing data that can be used in accordance with one embodiment.

FIG. 1 illustrates a summarization infrastructure 100. Summarization 102 indicates the entry point of the summarization program. The summarization contains three Application Programming Interfaces (APIs): initialize 104, run 106, and wrap-up 108. The initialize API 104 sets up the database to be able to run the summarization program (e.g. populating the summarization runtime table 200 indicated in FIG. 2). The run API 106 contains a list of steps that correspond to functional data transformations that are the result of business needs. The wrap-up API 108 cleans up anything that remains to be cleaned from the run of the summarization program and brings the environment back to a state in which the summarization program can be run again.

Locking and scoping are handled in the initialize API 104, which is a single transaction. If that transaction commits, then that submission of the summarization program becomes an instance of the summarization program. If the summarization program is submitted with valid parameters and it does not conflict with other runs of the summarization program, then the initialize API 104 can commit its transaction and return. Otherwise, the initialize API 104 itself will rollback the transaction and it will raise a message as determined necessary by business needs. Additional criteria can be used to determine whether the initialize API 104 can commit a transaction. Each instance of the summarization program can be assigned a worker ID 206 that can be used to uniquely identify its data throughout the runtime of the summarization program.

Recoverability is achieved through use of a summarization runtime table 202 as indicated in FIG. 2, which is populated with a list of steps. Each step is either a single transaction or is designed to be rerunnable. Upon completion, each step will mark itself as complete in the summarization runtime table 202, and then it will commit and return. Each step in the run API 106 can check the summarization runtime table 202 to see whether it has previously completed. If it finds that it has previously completed then it does nothing and returns. In this way the entire summarization program is rerunnable and the number of data transformations that need to be rerun during recovery can be reduced. For example, if the summarization program successfully completes some number of steps and then fails, then the summarization program simply needs to be rerun. The initialize API 104 will check the summarization runtime table 202 and see that it has already completed and it will return without doing anything. This is because the run API 106 will check the summarization runtime table 202 and if it sees that it has not completed, it will attempt to run all the steps again, but each step will check to see if it should run and therefore work will be resumed from where it left off, with the first step that has not completed. If multiple instances of the summarization program are allowed to run in parallel, then by design their resources are kept separate using the worker ID 206 and the user can select which incomplete instance to rerun in the case of recovery.

Any number of the summarization steps can be determined to be helper steps. "Helper Steps" are introduced to help optimize the performance of the summarization program. An example is indicated in FIG. 1 by the "Step i" which can be worked on by j helper database processes. In a previous solution, two instances of the summarization program running at the same time may not exist when both instances require the use of helper steps. Certain steps can take advantage of internal parallelization by the database, whereas certain steps are better to be broken up into batches and worked on by multiple database processes in parallel. In the latter case, the main database process enlists the "help" of other database processes through the use of the helper step infrastructure. The general rule is that the helper database processes should not begin work on their step until after the previous step is complete. For example, if "Step i" in FIG. 1 is a helper step, then the helper database processes with ID "1.2" through "1.j" should not start working on "Step i" until "Step i-1" has completed. Similarly, the step after a helper step should not start until all the helper database processes have completed. This interaction can be based on the data in the summarization runtime table 202.

After all the steps are complete, the wrapup API 108 cleans up the program by performing actions, including deletion of the data in the summarization runtime table 202 that corresponds to the current instance. Once the wrapup API 108 is complete, the worker ID 206 is freed and another instance of the summarization program can claim it.

Referring again to FIG. 1, an exemplary method for summarizing data that can be used in accordance with one embodiment is illustrated. The infrastructure can include a bulk infrastructure on which a bulk method of summarization may be tuned for sufficiently large volumes. Further, it can include an incremental infrastructure on which an incremental method of summarization may be tuned for sufficiently small volumes. Additionally, other methods of summarization can be designed on top of the infrastructure.

The need for a light version of the summarization program stems from the business need for quickly summarizing data from certain areas of a system and for the ability to package subsets of the functionality offered by the summarization program. This leads to the following requirements for light programs for at least one embodiment.

Define functional subsets (flows) of summarization program steps.

Allow disjoint subsets to be packaged separately as needed.

Enforce summarization program dependence of steps at run time.

Functional areas of summarization are defined by business needs and will be used for dynamic step enabling and packaging. Flow 1 110, flow 2 112, flow 3 114, and flow m 116, as indicated in FIG. 1, are functional areas of summarization. As many subsets of the summarization steps as exist can be defined as functional areas depending on those business needs. If two areas do not overlap (e.g. there does not exist a step that is present in both areas) then the areas may be packaged separately. This can be achieved by using program code that enforces dependencies only at runtime and not at compile time; e.g. dynamic SQL. That is, the only dependency of the summarization program on the functional area can be through the use of, for example, dynamic SQL in the run API 106. Furthermore, an instance of the summarization program can execute any or all of the functional areas depending on the parameters passed to the summarization program.

Because the methods described herein can use, for example, dynamic SQL, it is important to note that the approach is not susceptible to buffer overload attacks. This is ensured since all inputs to the dynamic SQL statements are generated from within the summarization program and generally not from user input. The input to a dynamic SQL statement includes a step name generated from a list of steps that is internal to the summarization program and includes a worker ID that is an integer generated by the summarization program.

Any amount of interaction between the functional areas can exist as long as packaging requirements determined by business needs are met and the summarization program is always re-runnable regardless of which subset of the summarization program's steps are run.

FIGS. 3-5 disclose examples of pseudo-code for summarizing data that can be used in accordance with one embodiment. The infrastructure of summarization with light programs and helper steps may be generally implemented in various embodiments based on the pseudo-code disclosed in FIGS. 3-5.

Figure 6:
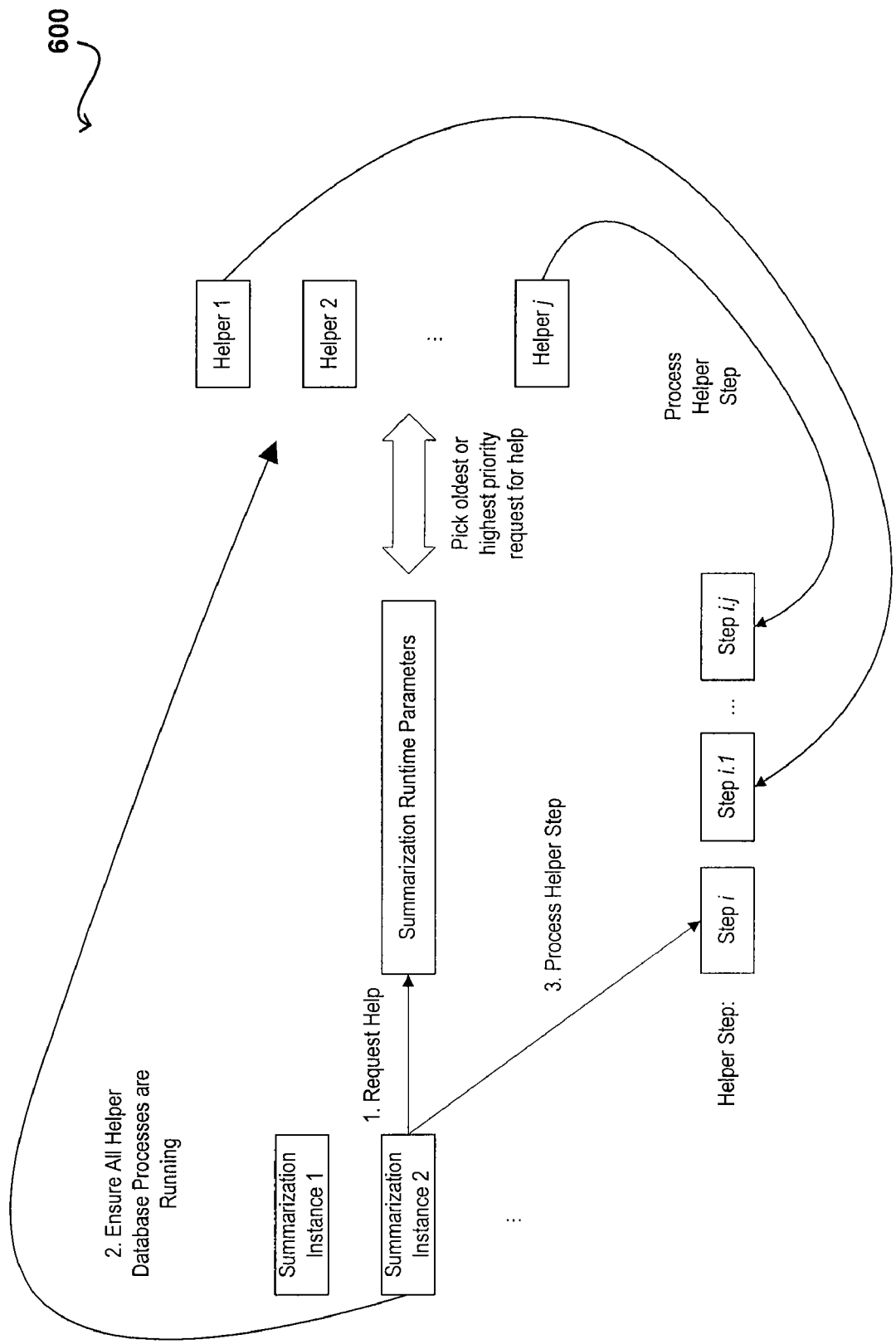
FIG. 6 illustrates an exemplary method for summarizing data that can be used in accordance with one embodiment.

FIG. 6 illustrates an exemplary method 600 for summarizing data that can be used in accordance with one embodiment. Some number of the steps of the summarization program can be defined to be helper steps. For example, in "Step i" in FIG. 6, it is desirable to break up the data transformation into batches. The batches can be completed in parallel by different database processes, called helper database processes, for example "Helper 1" through "Helper j" in FIG. 6. Helper database processes can be shared among the bulk and incremental instances of the summarization program using the infrastructure described herein. The instance of the summarization program can proceed with processing the batched work even while it is waiting for the helper database processes to also begin processing the batched work, as indicated in FIG. 6 by "Process Helper Step".

If a summarization program must process a unit of work that could be processed by a helper, the summarization program may issue a request for help. Furthermore, the summarization program may make several separate requests for help each time the program encounters a helper step, each request of which can request the full attention of the helpers. If the helpers are available to meet that request, the helpers will help the summarization program. Accordingly, multiple instances of the summarization program can be running at the same time, which encourages the existence of helpers with an efficient mechanism for distributing help. The helpers may, by design, help wherever possible. Helpers do not necessarily need to evenly distribute themselves on all requests, since in various embodiments it is more desirable to complete a particular request quickly, rather than to attempt to bring down the overall processing time of all the requests from instances of the summarization program by working on more than one request at the same time. The helpers can process one request, since it may also be the case that it is more efficient to have all the helpers do a particular type of work rather than all different types of work. If for some reason processing is interrupted (e.g., an error occurs, the request is satisfied, etc.), the helpers can move to the next request. If one helper process fails, other helpers can still begin work on the request of a different instance of the summarization program and the failed helper will be automatically resubmitted to work on that different instance. The end user can have access to problem details of the failed helper. Accordingly, the helpers may dynamically move between requests and help different processes that are running at the same time. For example, to provide results and feedback to an end user, all helpers can be set to work at one step, one process at a time, rather than having all the helpers evenly distributed. Although the total processing duration between processing all requests when distributed evenly or when focused on specific task may be the same, end users will periodically see results when helpers complete processes serially while focused on a task. Once a summarization program's request has been satisfied, the summarization program will retract the request for help, and the helpers can move on to another request for help even though they may return to the original instance of the summarization program if it extends another request for help.

The summarization program may also manage administrative tasks. For example, when a summarization program requires processing of steps that are candidates for processing as a helper step, the summarization program may also confirm that helper processes are actually running. If and when an error occurs, it may be desirable to halt the execution of the summarization program and/or all of the helpers until the error is resolved. The summarization program may track helpers, for example, through request IDs, logging, or any other appropriate method. Once a helper step has completed processing a request and no other outstanding requests remain, the helper step may be left alive in an idle state. This may be preferably since the summarization program may need the assistance of helper steps in the near future. Further, this may be more useful for developers while debugging. For example, if a helper step is kept alive, logs tracking the history of the helper step may be more easily accessible. The helpers may also be killed if preferable for performance and/or efficiency requirements often constrained by resources.

Helpers may be managed by defining an interface point. This interface point may be a dependency between all processes. For example, consider multiple parallel instances of a summarization program running simultaneously. The summarization program may break its work into batches and then issue a request for help for any portions that are candidates for processing by a helper step. The summarization program may continue working while the request for help is outstanding. If helpers are available, they will assist the summarization program. Otherwise, the process may not be worked on by helpers, but instead by the summarization program itself. Once the request has been completed (either by one or more helpers or by the summarization program itself), the summarization program will withdraw its request for help. Accordingly, the summarization program is not dependent on the helpers. The summarization may complete its own work with or without the help of helpers.

Further, helpers may become independent of the summarization program. For example, while helpers may be busy helping with three existing requests, a newly issued request may not have to wait until all three request have been completed. Rather, a helper may be able to begin helping the newly issued request. Even though subsequent help may have been required by the original requests, a helper may move to process the new request and then return to help with the original requests.

Helpers can be disconnected from summarization instances so that they can more efficiently and more evenly handle requests for help. To describe one type of parallelism, when executing a SQL statement and operating on a bulk amount of data, the database may or may not be able to use internal database slaves or internal processes to break up the work and process the work all at the same time. For example, to update a flag on a large table, many solutions cannot efficiently break up the task using database slaves. Helper steps can manually break up the work and begin multiple sessions to process the work in batches, all working at the same time.

Figure 7:
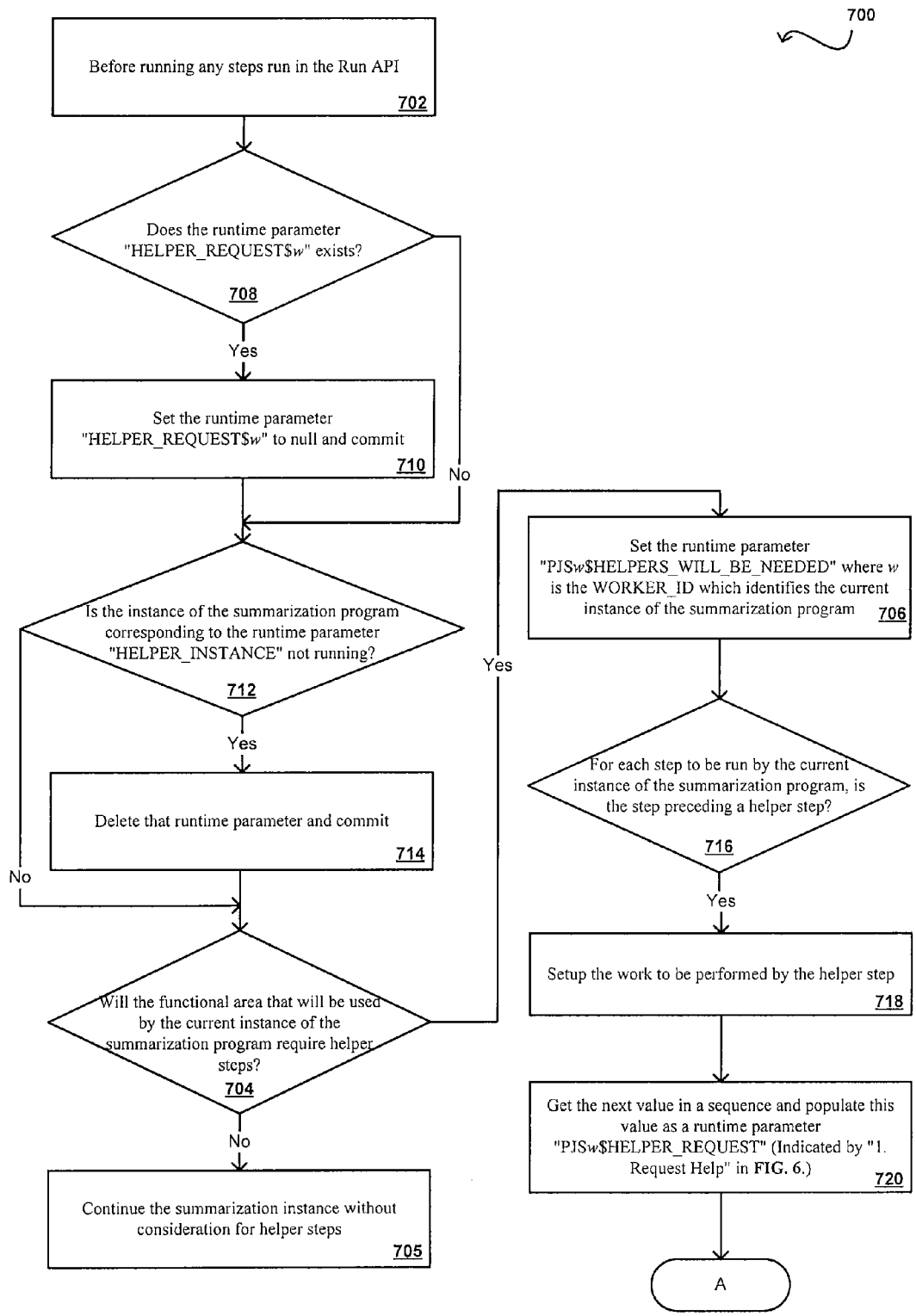
FIGS. 7-10 illustrate exemplary methods for summarizing data that can be used in accordance with one embodiment.

FIGS. 7-10 illustrate exemplary methods for summarizing data that can be used in accordance with one embodiment. FIG. 7 illustrates an instance of the summarization program 700. Before running any steps in the run API 702 and if the runtime parameter "HELPER_REQUEST$w" exists 708, then "HELPER_REQUESTS$w" is set to null and committed 710. If no steps have run in the run API and if the instance of the summarization program corresponding to the runtime parameter "HELPER_INSTANCE" is not running 712, then that runtime parameter is deleted and this is committed 714. If the functional area that will be used by the current instance of the summarization program will not require helper steps 704, then the summarization instance is continued without consideration for helper steps 705. Otherwise, a runtime parameter will be set to "PJSw$HELPERS_WILL_BE_NEEDED" where w is the WORKER_ID that identifies the current instance of the summarization program 706.

If for each step to be run by the current instance of the summarization program, the step precedes a helper step, then the work to be performed by the helper step is setup 718 and the next value in a sequence is acquired and this value is populated as a runtime parameter "PJSw$HELPER_REQUEST" (indicated by "1. Request Help" in FIG. 6) 720.

Figure 8:
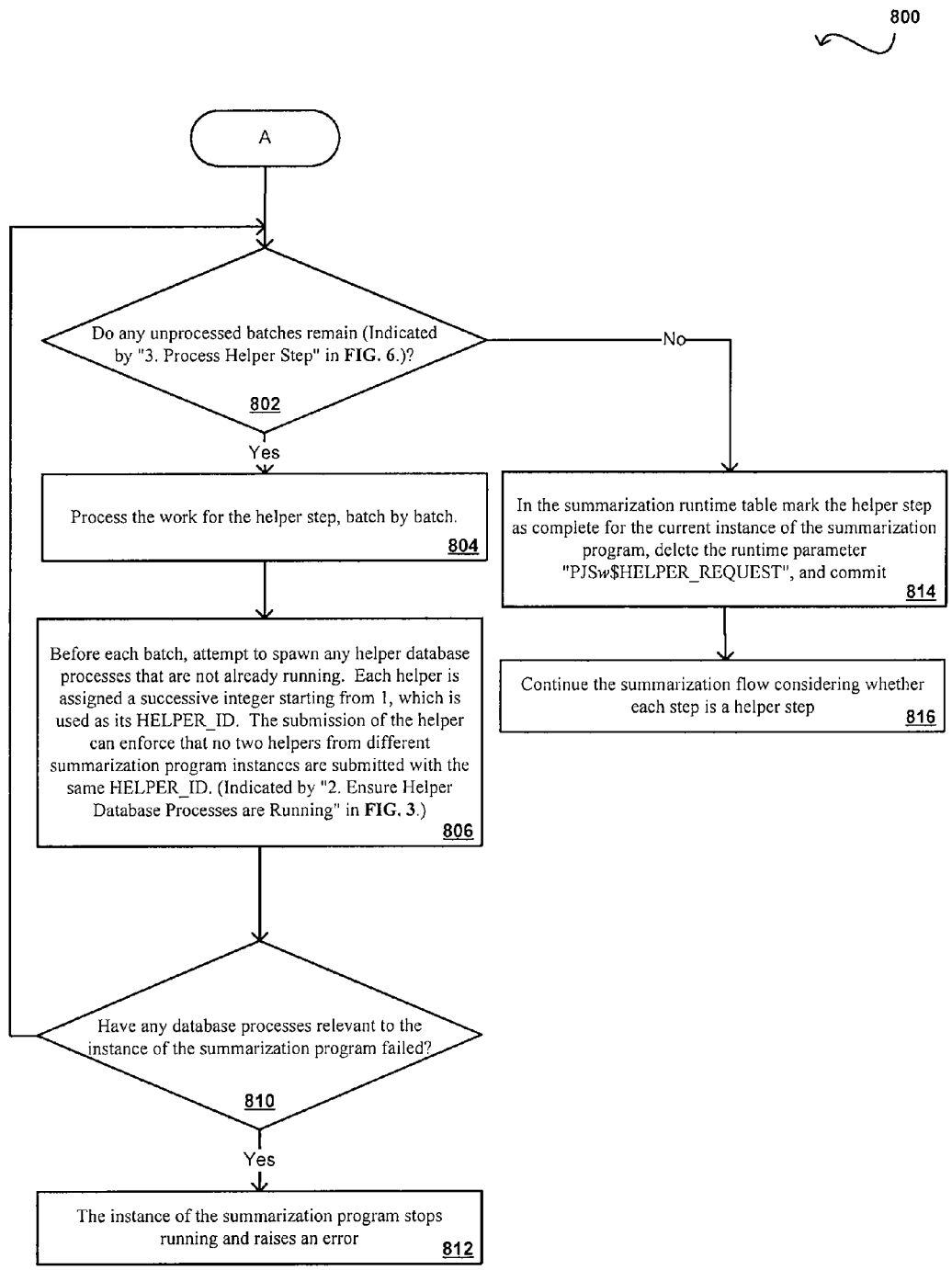

FIG. 8 shows steps 800 that can continue the instance of the summarization program of FIG. 7. The work for the helper step is processed, batch by batch, until no unprocessed batches remain (indicated by "3. Process Helper Step" in FIG. 6) 802. While the batches are being processed, database processes relevant to the instance of the summarization program are checked for failure 804. If such a database process has failed 810, then the instance of the summarization program stops running and raises an error 812. Before each batch, any helper database processes that are not already running are attempted to be spawned 806. Each helper is assigned a successive integer starting from 1, which is used as its HELPER_ID. The submission of the helper can enforce that no two helpers from different summarization program instances are submitted with the same HELPER_ID (indicated by "2. Ensure Helper Database Processes are Running" in FIG. 6).

Once all the work is complete and/or there are no unprocessed batches remaining 802, the helper step is marked in the summarization runtime table as complete for the current instance of the summarization program, the runtime parameter "PJSw$HELPER_REQUEST" deleted, and the changes are committed 814. Subsequently, the summarization flow is continued considering whether each step is a helper step 816. Note that helper steps may directly precede helper steps if required by design.

Figure 9:
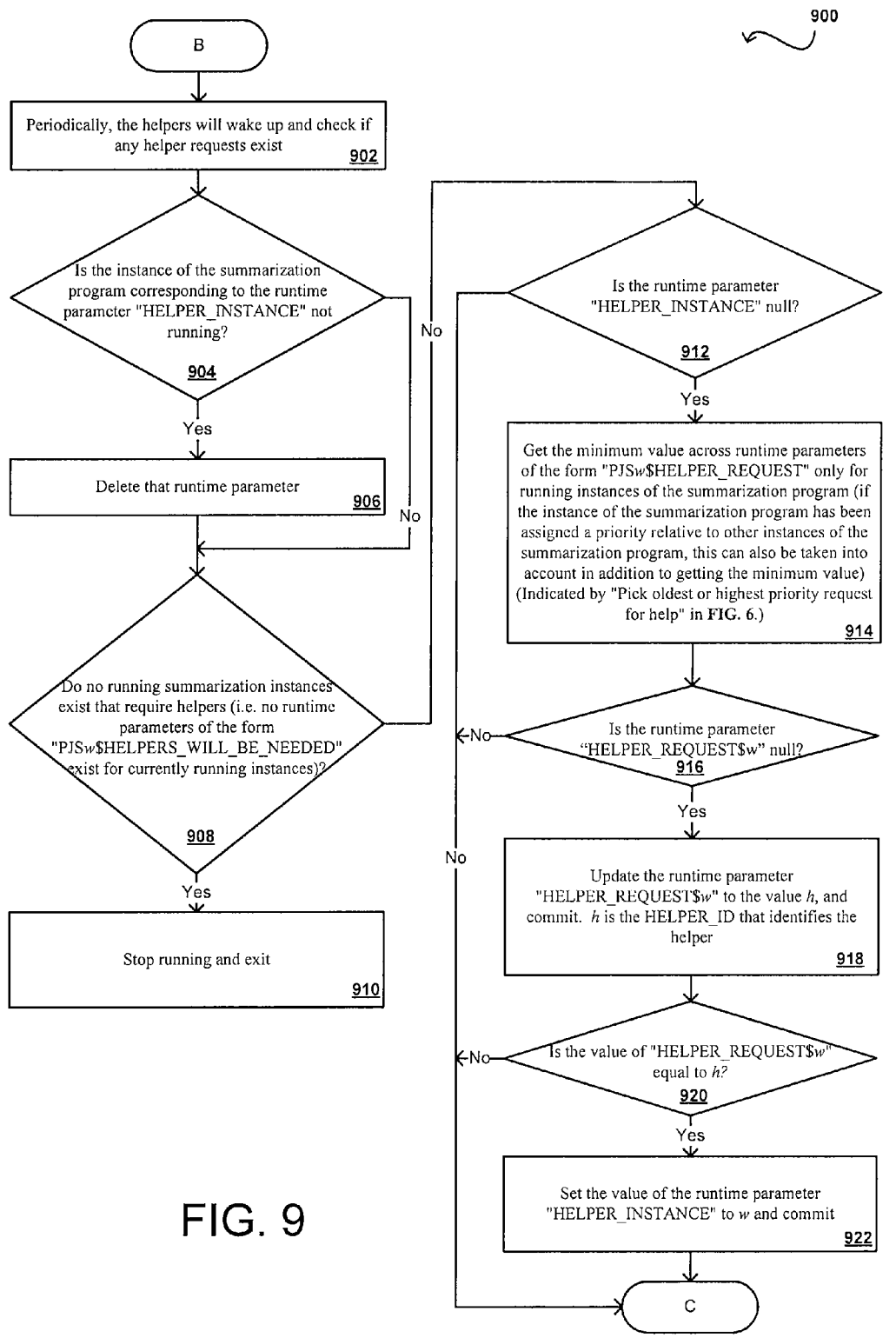

FIG. 9 illustrates a helper database process 900. Periodically, a helper will wake up and check if any helper requests exist 902. If the instance of the summarization program corresponding to the runtime parameter "HELPER_INSTANCE" is not running 904, then that runtime parameter is deleted 906. Regardless, if no running summarization instances exist that require helpers (i.e. no runtime parameters of the form "PJSw$HELPERS_WILL_BE_NEEDED" exist for currently running instances) 908, then the process is stopped and exited 910.

Otherwise, if the runtime parameter "HELPER_INSTANCE" is null 912, then the minimum value across runtime parameters of the form "PJSw$HELPER_REQUEST" only for running instances of the summarization program are acquired 914. If the instance of the summarization program has been assigned a priority relative to other instances of the summarization program, this can also be taken into account in addition to getting the minimum value (indicated by "Pick oldest or highest priority request for help" in FIG. 6). If the runtime parameter "HELPER_REQUEST$w is null 916, then the runtime parameter "HELPER_REQUEST$w" is updated to the value h and this is committeed 918. h is the HELPER_ID that identifies the helper. If the value of "HELPER_REQUEST$w" is equal to h 920, then the value of the runtime parameter "HELPER_INSTANCE" is set to w and this is committed 922.

Figure 10:
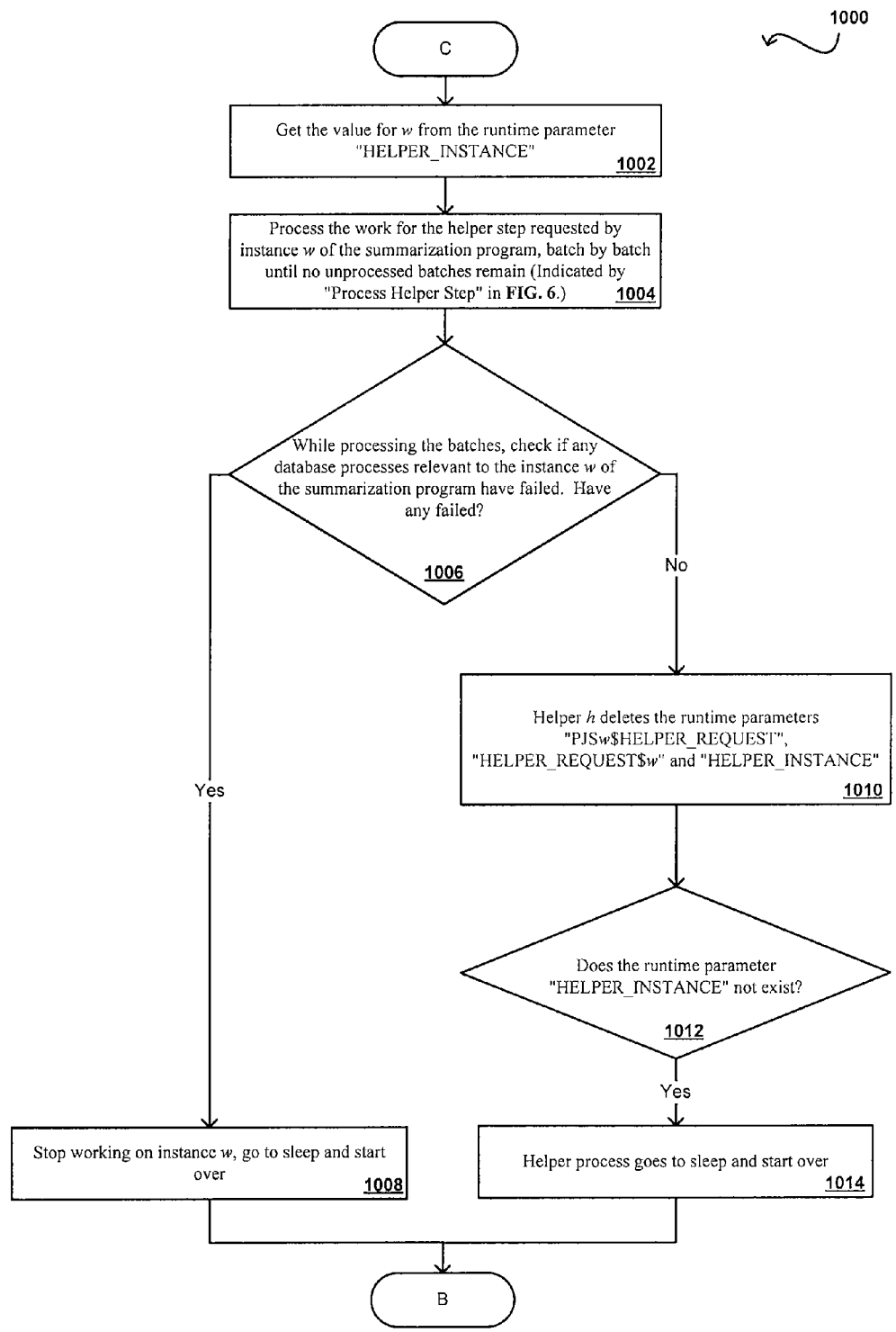

FIG. 10 shows steps 1000 that can continue the instance of the summarization program of FIG. 9. The value for w is acquired from the runtime parameter "HELPER_INSTANCE" 1002. The work for the helper step requested by instance w of the summarization program is processed, batch by batch, until no unprocessed batches remain (indicated by "Process Helper Step" in FIG. 6) 1004. While the batches are being processed, if any database processes relevant to the instance w of the summarization program have failed 1006, then work on instance w is stopped and the helper process goes to sleep and starts over 1008. If no database processes relevant to the instance w of the summarization program have failed, and no batches remain to be processed, then helper h deletes the runtime parameters "PJSw$HELPER_REQUEST," "HELPER_REQUEST$w," and "HELPER_INSTANCE" 1010. Once the runtime parameter "HELPER_INSTANCE" does not exist 1012, the helper process goes to sleep and starts over 1014.

Figure 11:
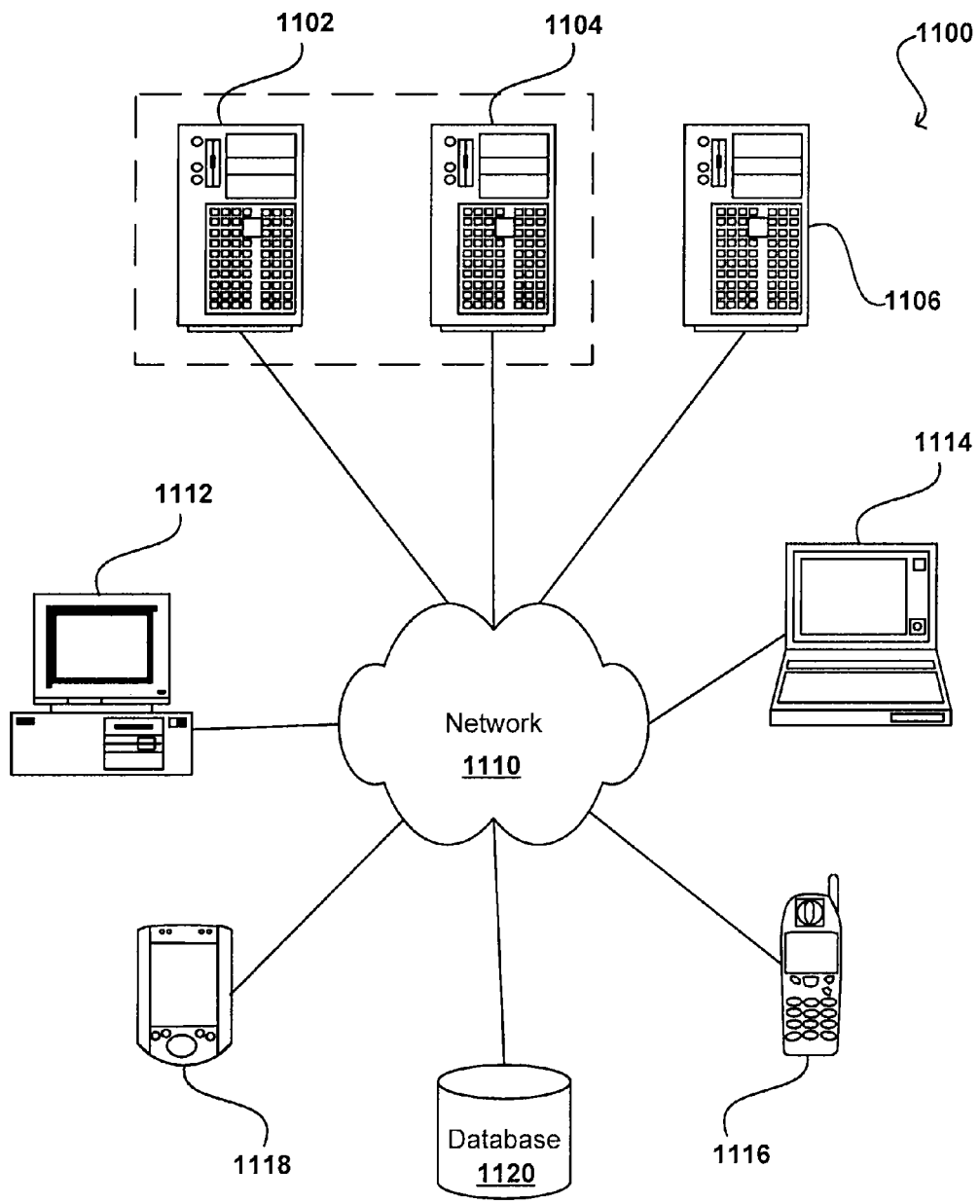
FIG. 11 illustrates components of a computer network that can be used in accordance with one embodiment.

Operating Environment:

FIG. 11 is a block diagram illustrating components of an exemplary operating environment in which various embodiments may be implemented. The system 1100 can include one or more user computers, computing devices, or processing devices 1112, 1114, 1116, 1118, which can be used to operate a client, such as a dedicated application, web browser, etc. The user computers 1112, 1114, 1116, 1118 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1112, 1114, 1116, 1118 may also have any of a variety of applications, including one or more development systems, database client and/or server applications, and Web browser applications. Alternatively, the user computers 1112, 1114, 1116, 1118 may be any other electronic device, such as a thin-client computer, Internet-enabled gaming system, and/or personal messaging device, capable of communicating via a network (e.g., the network 1110 described below) and/or displaying and navigating Web pages or other types of electronic documents. Although the exemplary system 1100 is shown with four user computers, any number of user computers may be supported.

In most embodiments, the system 1100 includes some type of network 1110. The network may can be any type of network familiar to those skilled in the art that can support data communications using any of a variety of commercially-available protocols, including without limitation TCP/IP, SNA, IPX, AppleTalk, and the like. Merely by way of example, the network 1110 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1102, 1104, 1106 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1106) may be dedicated to running applications, such as a business application, a Web server, application server, etc. Such servers may be used to process requests from user computers 1112, 1114, 1116, 1118. The applications can also include any number of applications for controlling access to resources of the servers 1102, 1104, 1106.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1112, 1114, 1116, 1118. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1112, 1114, 1116, 1118.

The system 1100 may also include one or more databases 1120. The database(s) 1120 may reside in a variety of locations. By way of example, a database 1120 may reside on a storage medium local to (and/or resident in) one or more of the computers 1102, 1104, 1106, 1112, 1114, 1116, 1118. Alternatively, it may be remote from any or all of the computers 1102, 1104, 1106, 1112, 1114, 1116, 1118, and/or in communication (e.g., via the network 1110) with one or more of these. In a particular set of embodiments, the database 1120 may reside in a storage-area network ("SAN") familiar to those skilled in the art. Similarly, any necessary files for performing the functions attributed to the computers 1102, 1104, 1106, 1112, 1114, 1116, 1118 may be stored locally on the respective computer and/or remotely, as appropriate. In one set of embodiments, the database 1120 may be a relational database, such as Oracle 10g, that is adapted to store, update, and retrieve data in response to SQL-formatted commands.

Figure 12:
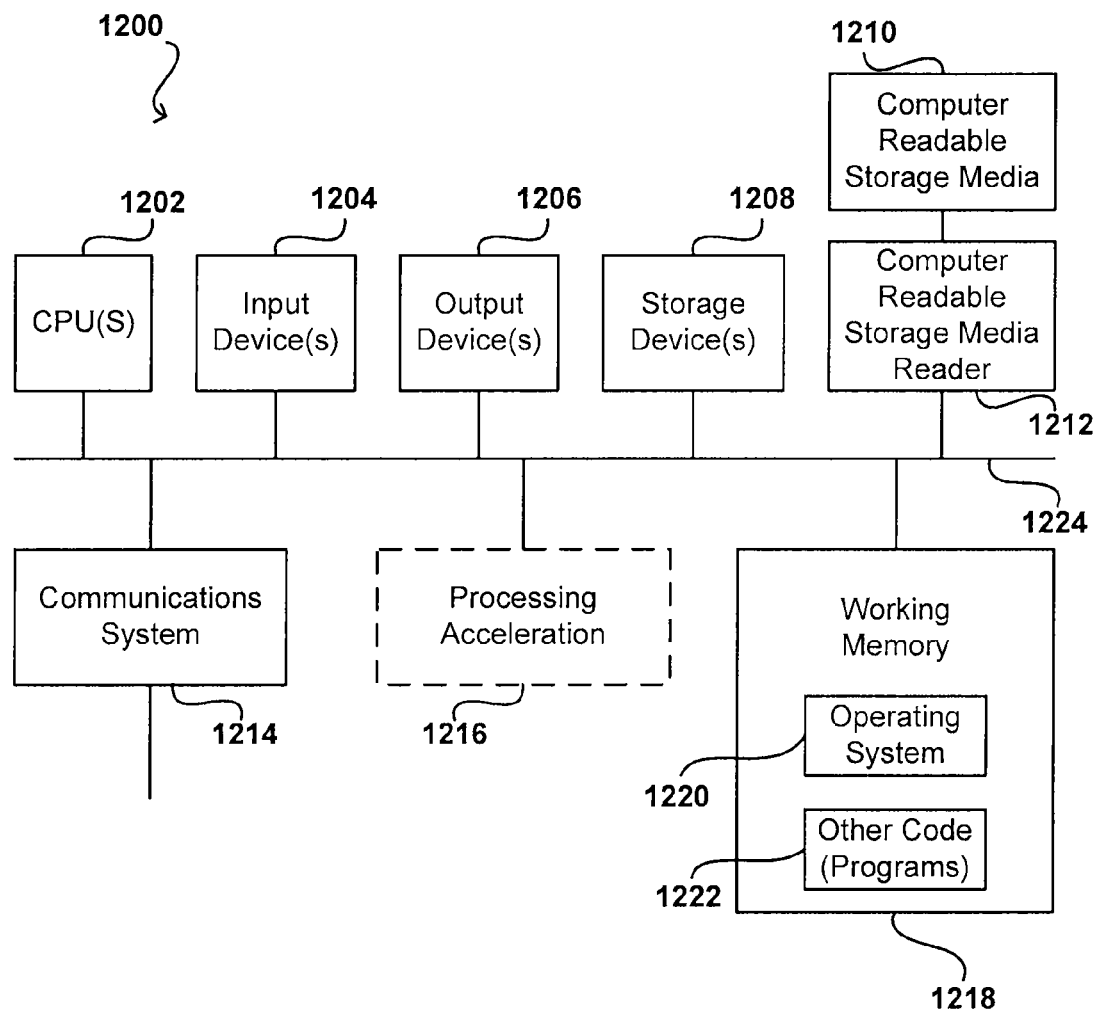
FIG. 12 illustrates components of a computerized device that can be used in accordance with one embodiment.

FIG. 12 illustrates an exemplary computer system 1200, in which various embodiments may be implemented. The system 1200 may be used to implement any of the computer systems described above. The computer system 1200 is shown comprising hardware elements that may be electrically coupled via a bus 1224. The hardware elements may include one or more central processing units (CPUs) 1202, one or more input devices 1204 (e.g., a mouse, a keyboard, etc.), and one or more output devices 1206 (e.g., a display device, a printer, etc.). The computer system 1200 may also include one or more storage devices 1208. By way of example, the storage device(s) 1208 can include devices such as disk drives, optical storage devices, solid-state storage device such as a random access memory ("RAM") and/or a read-only memory ("ROM"), which can be programmable, flash-updateable and/or the like.

The computer system 1200 may additionally include a computer-readable storage media reader 1212, a communications system 1214 (e.g., a modem, a network card (wireless or wired), an infra-red communication device, etc.), and working memory 1218, which may include RAM and ROM devices as described above. In some embodiments, the computer system 1200 may also include a processing acceleration unit 1216, which can include a digital signal processor DSP, a special-purpose processor, and/or the like.

The computer-readable storage media reader 1212 can further be connected to a computer-readable storage medium 1210, together (and, optionally, in combination with storage device(s) 1208) comprehensively representing remote, local, fixed, and/or removable storage devices plus storage media for temporarily and/or more permanently containing, storing, transmitting, and retrieving computer-readable information. The communications system 1214 may permit data to be exchanged with the network and/or any other computer described above with respect to the system 1200.

The computer system 1200 may also comprise software elements, shown as being currently located within a working memory 1218, including an operating system 1220 and/or other code 1222, such as an application program (which may be a client application, Web browser, mid-tier application, RDBMS, etc.). It should be appreciated that alternate embodiments of a computer system 1200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of summarizing data, comprising:
providing a summarization program including instructions for summarizing data for a transaction processing system;
determining at least one functional aspect of the transaction processing system for which a summarization of a subset of the data is desired;
packaging a functional subset of the summarization program able to summarize data corresponding to a functional aspect of the transaction processing system;
exposing the functional subset to a user as a light summarization program,
wherein summarization dependencies of the functional subset are enforced at runtime; and
designating portions of the summarization program as able to request assistance from helper processes able to be shared among instances of the summarization programs and able to execute in parallel.

2. A method according to claim 1, wherein:
the summarization program includes an incremental infrastructure on which an incremental method of summarization is provided that is tuned for smaller volumes than is a bulk summarization program.

3. A method according to claim 1, wherein:
the summarization program includes a summarization infrastructure upon which a summarization method can be generated to provide flexibility of summarization.

4. A method according to claim 1, wherein:
a time of processing for the light summarization program is less than a time of processing for a complete summarization program.

5. A method according to claim 1, further comprising:
packaging multiple functional subsets of the summarization program able to summarize data corresponding to functional aspects of the transaction processing system, wherein summarization dependencies of the multiple functional subset are enforced at runtime.

6. A method according to claim 1, wherein:
an instance of the summarization program is able to process any or all of the functional subsets depending on parameters passed to the summarization program.

7. A method according to claim 6, wherein:
the functional subsets are able to interact according to requirements of the functional subsets.

8. A method according to claim 1, further comprising:
enabling instances of the summarization program to proceed with processing while requesting assistance from the helper processes.

9. A method according to claim 1, further comprising:
setting a parameter for an instance of the summarization process to request assistance from the helper processes.

10. A method according to claim 1, further comprising:
defining rules for the helper processes behavior in responding to requests for assistance.

11. A system for summarizing data, comprising:
a processor; and
a memory device including instructions that, when executed by the processor, cause the processor to:
provide a summarization program including instructions for summarizing data for a transaction processing system;
determine at least one functional aspect of the transaction processing system for which a summarization of a subset of the data is desired;
package a functional subset of the summarization program able to summarize data corresponding to a functional aspect of the transaction processing system;
expose the functional subset to a user as a light summarization program, wherein summarization dependencies of the functional subset are enforced at runtime; and
designate portions of the summarization program as able to request assistance from helper processes able to be shared among instances of the summarization programs and able to execute in parallel.

12. A system according to claim 11, wherein the memory device further includes instructions that, when executed by the processor, cause the processor to:
enable instances of the summarization programs to proceed with processing while requesting assistance from the helper processes.

13. A system according to claim 11, wherein the memory device further includes instructions that, when executed by the processor, cause the processor to:
 define rules for the helper processes behavior in responding to requests for assistance.

14. A computer-readable memory having stored therein a sequence of instructions which, when executed by a processor, causes the processor to summarize data by:
 providing a summarization program including instructions for summarizing data for a transaction processing system;
 determining at least one functional aspect of the transaction processing system for which a summarization of a subset of the data is desired;
 packaging a functional subset of the summarization program able to summarize data corresponding to a functional aspect of the transaction processing system;
 exposing the functional subset to a user as a light summarization program, wherein summarization dependencies of the functional subset are enforced at runtime; and
 designating portions of the summarization program as able to request assistance from helper processes able to be shared among instances of the summarization programs and able to execute in parallel.

15. A computer-readable memory according to claim 14, further comprising:
 enabling instances of the summarization programs to proceed with processing while requesting assistance from the helper processes.

16. A computer-readable memory according to claim 14, further comprising:
 defining rules for the helper processes behavior in responding to requests for assistance.

\* \* \* \* \*

UNITED STATES PATENT AND TRADEMARK OFFICE
CERTIFICATE OF CORRECTION

PATENT NO. : 8,407,713 B2
APPLICATION NO. : 12/147726
DATED : March 26, 2013
INVENTOR(S) : Vermette et al.

It is certified that error appears in the above-identified patent and that said Letters Patent is hereby corrected as shown below:

In the Specification:

In column 8, line 61, delete "committeed" and insert -- committed --, therefor.

In column 9, line 46, delete "may can" and insert -- may --, therefor.

Signed and Sealed this
Ninth Day of July, 2013

Teresa Stanek Rea
*Acting Director of the United States Patent and Trademark Office*